(12) United States Patent
Ernst

(10) Patent No.: US 6,446,023 B1
(45) Date of Patent: Sep. 3, 2002

(54) METHOD FOR MONITORING THE AIR PRESSURE OF THE TIRES OF A MOTOR VEHICLE

(75) Inventor: Gerhard Ernst, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/550,492

(22) Filed: Apr. 17, 2000

(30) Foreign Application Priority Data

Apr. 15, 1999 (DE) .......................................... 199 17 034

(51) Int. Cl.⁷ .............................................. G01L 11/00
(52) U.S. Cl. ..................... 702/138; 73/146.5; 116/34 R; 340/442; 340/444
(58) Field of Search .......................... 702/138; 340/444, 340/442; 116/34 R; 73/146.5

(56) References Cited

U.S. PATENT DOCUMENTS 5,614,882 A * 3/1997 Latarnik et al. .......... 116/34 R

* cited by examiner

Primary Examiner—John S. Hilten
Assistant Examiner—Stephen J. Cherry
(74) Attorney, Agent, or Firm—Walter Ottessen

(57) ABSTRACT

The invention relates to a method for monitoring the air pressure of a tire of a motor vehicle with a tire pressure control system. The invention further relates to a motor vehicle having a tire pressure control system with which the method can be carried out. The tire pressure control system includes tire pressure control devices (4a to 4d) on each of the wheels (2a to 2d), which transmit to a central unit, at regular intervals, a data transmission which contains, inter alia, the air pressure measured in the tires. The central unit generates a warning signal when the determined air pressure deviates by more than a pregiven amount from the stored air pressure. The motor vehicle contains a second tire pressure control system which operates independently of the first tire pressure control system and monitors the air pressure in the tires of the motor vehicle at least when a transmission pause, which is too long, occurs between two data transmissions of one of the tire pressure control devices (4a to 4d).

6 Claims, 2 Drawing Sheets

METHOD FOR MONITORING THE AIR PRESSURE OF THE TIRES OF A MOTOR VEHICLE

FIELD OF THE INVENTION

The invention relates to a method for monitoring the air pressure of the tires of a motor vehicle utilizing a tire pressure control system. The control system has air pressure control devices on respective ones of the wheels of the motor vehicle and a central unit. The method includes method steps wherein each tire pressure control device measures the air pressure of the tire assigned thereto at time intervals; each tire pressure control device transmits a data transmission to the central unit at time intervals with the data transmission containing at least the measured air pressure and an individual identifier characterizing the tire pressure control device and a transmission pause takes place between two sequential data transmissions of a specific tire pressure control device; and, the central unit compares the transmitted air pressure with an air pressure stored therein and generates a warning signal when the transmitted air pressure deviates beyond the stored air pressure by a pregiven amount.

The invention also relates to a motor vehicle having a tire pressure control system with which the method can be carried out.

BACKGROUND OF THE INVENTION

For reasons of safety, the tire pressure of motor vehicles must be checked regularly and this is often neglected by the driver of the motor vehicle for various reasons. For this reason, tire pressure control systems have already been developed which include a tire pressure control device on each wheel which automatically measures the tire pressure of the tires of the motor vehicle and announces to the driver of the motor vehicle at least a critical deviation from a desired tire pressure. The tire pressure control devices can, for example, be vulcanized into the tires or can be mounted with adhesive or can be attached on or in the valve or on or in the wheel rim. Appropriate configurations are known.

German patent publication 4,205,911 discloses a method for carrying out the measurement of the air pressure of the tires of a motor vehicle utilizing a tire pressure control system of the kind mentioned above. The tire pressure control system includes tire pressure control devices assigned to corresponding ones of the tires of the motor vehicle and these control devices transmit a high-frequency signal at regular time intervals to a central unit. The high-frequency signal includes at least a measured pressure signal and an individual identifier. The data, which are transmitted to the central unit, cannot be mistaken for data which are, for example, transmitted from another motor vehicle because of the transmission of an individual identifier. In the central unit, value pairs of the form (identifier of the tire pressure control device/wheel position) are stored for each wheel of the motor vehicle so that a conclusion can be drawn in the central unit via a corresponding comparison as to which identifier is transmitted with the corresponding pressure signal from which wheel position of the motor vehicle. A deviation of the transmitted pressure signal from a pregiven value at a wheel position is displayed by the central unit to the driver of the motor vehicle so that the driver can initiate appropriate measures.

The tire pressure control system disclosed in German patent publication 4,205,911 affords the advantage that the tire pressure control devices are mounted directly on the wheels of the motor vehicle and, in this way, the air pressure in the tires can be measured directly and can be transmitted contactlessly by a high-frequency signal to the central unit. A specific frequency of 434 MHz is used at the present time for the high-frequency signal. This frequency is also used by other transmitters such as weather stations which have, in part, a very high transmitting power. If a motor vehicle, which is equipped with a tire pressure control system of the above type, is in the vicinity of such a transmitter, then it can occur that the high-frequency signals, which are transmitted by the tire pressure control devices, are superposed with the high-frequency signals transmitted by the "disturbing" transmitter so that, in the central unit, the data, which are transmitted by the tire pressure control devices, can no longer be received without error or not at all. This causes the situation that the monitoring of the air pressure of the tires of the motor vehicle is no longer reliably possible in the region of the disturbing transmitter.

In addition to the above-described disturbance, additional disturbances can occur in the tire pressure control system. The tire pressure control devices are supplied by batteries whose service life is limited so that a tire pressure control device can become disabled after the service life of a battery has expired and the air pressure of the corresponding tire of the motor vehicle can no longer be monitored. Finally, component defects can occur in the tire pressure control system which lead to the disablement of one or more tire pressure control devices.

In summary, it can be seen that short-term disturbances (caused by a disturbance transmitter) as well as long-term disablements can occur which require maintenance (for example, caused by a run-down battery) in a tire pressure control system such as disclosed in German patent publication 4,205,911. A driver of a motor vehicle no longer takes a warning seriously if a disablement is displayed for each short-term disturbance of the tire pressure control system and the driver later determines that the system functions without error (for example, when the driver has left the region of the disturbing transmitter). If then a long-term disablement occurs in the tire pressure control system (for example, because of a run-down battery), the driver of the motor vehicle could fail to consider a corresponding warning and continue to drive over a long time span with a damaged tire pressure control system. In this case, the safety of the motor vehicle is reduced.

SUMMARY OF THE INVENTION

It is an object of the invention to provide a method for monitoring the air pressure of the tires of a motor vehicle utilizing a tire pressure control system wherein erroneous indications of a disturbance of the operation of the system can be avoided to the greatest extent possible. It is also an object of the invention to provide a motor vehicle having a tire pressure control system with which the method can be carried out.

The method of the invention is for monitoring the pressure of the tires of a motor vehicle utilizing a first tire pressure control system which includes a central unit and a plurality of tire pressure control devices on corresponding ones of the wheels of the motor vehicle for respective ones of the tires. The method includes the steps of: utilizing each one of the tire pressure control devices to measure the air pressure in the tire corresponding thereto at time intervals; causing each one of the tire pressure control devices to transmit a data transmission to the central unit at time intervals with the data transmission containing at least the measured air pressure and an individual identifier characterizing the one tire pressure control device and with a transmission pause being present between two sequential data transmissions of a specific one of the tire pressure control devices; monitoring each of the transmission pauses in the central unit which elapses after the receipt of a data transmission which is transmitted by a specific one of the tire pressure control devices; monitoring the air pressure of the tires of the motor vehicle utilizing a second tire pressure control system at least when at least one of the transmission pauses exceeds a pregiven first limit value; comparing the transmitted air pressure to an air pressure stored in the central unit; and, causing the central unit to generate a warning signal when the transmitted air pressure deviates from the stored air pressure beyond a pregiven amount.

A transmission pause, which is present between two sequential data transmissions of a specific tire pressure control device, is defined herein as the time which elapses starting with the receipt of a data transmission of a specific tire pressure control device in the central unit up to the receipt of the next data transmission of the same specific tire pressure control device in the central unit. A transmission pause occurs in that a specific tire pressure control device transmits data transmissions to the central unit in time intervals. A transmission pause also occurs in that a specific tire pressure control device becomes disabled after the transmission of a data transmission to the central unit (for example, because the battery is exhausted) and thereby transmits no further data transmissions. A third possibility of how a transmission pause occurs is that a specific tire pressure control device has sent out data transmissions at time intervals but these data transmissions could not be received by the central unit (for example, because the motor vehicle equipped with the tire pressure control system is located in the region of a disturbance transmitter). The central unit cannot decide for which reason the transmission pause occurs from the above-mentioned possibilities. The central unit only initiates the measures set forth above when a transmission pause exceeds the pregiven first limit value.

The basic idea of the invention is that a second tire pressure control system is provided ancillary to the first tire pressure control system which has tire pressure control devices which transmit the measured air pressure in the form of high-frequency signals to the central unit. The second tire pressure control system has an operation which is independent of the first tire pressure control system and transmits no data via high-frequency signals. In this way, the second tire pressure control system cannot temporarily be disturbed by a disturbance transmitter. The second tire pressure control system is preferably a simply configured cost effective system which reliably monitors the tire pressure of the wheels with lesser accuracy than the first tire pressure control system. The second tire pressure control system can, for example, be a tire pressure control system wherein the air pressure of the tires is determined from the extent of the roll-off or the air pressure of the tires is determined from their vibration behavior. Tire pressure control systems wherein the air pressure from the extent of the roll-off are disclosed, for example, in European patent publications 0,647,536 and 0,675,812 as well as German patent publication 4,400,913. Tire pressure control systems wherein the air pressure of the tires is determined from their vibration behavior are disclosed, for example, in German patent publications 197 23 037 and 4,330,617 as well as U.S. Pat. No. 5,753,809 incorporated herein by reference.

The advantages achieved with the invention are especially that a monitoring of the air pressure of the tires of the motor vehicle is ensured by the second tire pressure control system when there is a disturbance in the first tire pressure control system. For this reason, the safety of the motor vehicle is ensured at all times. In this way, a disturbance of the first tire pressure control system need not be announced to the driver of the motor vehicle and an erroneous indication of a disturbance of operation is precluded.

According to another feature of the invention, a warning signal is generated when at least one transmission pause exceeds a pregiven second limit value which is significantly greater than the first pregiven limit value. The second limit value is preferably so selected that a short-term disturbance of the first tire pressure control system is most likely canceled (for example, because the motor vehicle has left the region of the disturbing transmitter) within the time span which is pregiven by this limit value. A time is pregiven as the second limit value which lies in a range between 10 to 60 minutes. The advantage of this embodiment is that most likely only long-term disturbances of the first tire pressure control system are displayed to the driver of the motor vehicle which make maintenance or repair necessary so that fault displays of a disturbance of operation are substantially precluded. Temporary disturbances in which the air pressure of the tire is monitored with the second tire pressure control system are, in contrast, not displayed to the driver of the motor vehicle so that the driver is not confused by such displays.

According to another feature of the invention, a rotation sensor is permanently assigned to each wheel of the motor vehicle. The second tire pressure control system monitors the air pressure of the tires by means of the rotational sensor signals are known, for example, from European patent publications 0,647,536 and 0,675,812 as well as German patent publication 4,400,913. The advantage of this embodiment is seen in that almost any modern motor vehicle includes rpm sensors which are part of a slip control system. Accordingly, the motor vehicle requires no components, which would not already be available, in order to carry out the method of the invention.

According to still another embodiment of the invention, the air pressure of the tires of the motor vehicle is monitored as follows: permanently assigning rpm sensors to corresponding ones of the wheels of the motor vehicle; establishing at least one characteristic field utilizing the rpm sensor signals and the air pressures transmitted by the tire pressure control devices; when there is a disablement of a specific tire pressure control device, utilizing the characteristic field and the rpm sensor signals and the air pressures transmitted by the remaining tire pressure control devices to at least approximately determine the air pressure of the tire corresponding to the tire pressure control device which has become disabled; and, when the transmission pause of a specific tire pressure control device exceeds the pregiven first limit value, at least approximately determining the air pressure of the corresponding tire with the aid of the characteristic field, the rpm sensor signals and the air pressures transmitted by the remaining tire pressure control devices.

When one or more tire pressure devices become disabled, it is to be understood here and in the following that the central unit receives no data from this tire pressure control device. This can be because the function of the tire pressure control device is disturbed or that the vehicle is in the region of a disturbing transmitter.

The further embodiment utilizes the situation that mostly the two tire pressure control systems operate at the same time and therefore the above-mentioned characteristic field can be prepared with high accuracy. The advantage of the further embodiment is seen in that the accuracy of the second tire pressure control system, which determines the air pressure of the tires from the rpm sensor signals, can be greatly increased.

According to another feature of the invention, the method includes the further steps of: permanently allocating an rpm sensor to each one of the wheels; forming at least one characteristic field from the signals transmitted by the rpm sensors and the air pressure transmitted by the tire pressure control devices; determining whether the air pressure in the tires is adequate or whether the air pressure in at least one of the tires is not adequate by utilizing the characteristic field when knowing the rpm signals when several of the tire pressure control devices are disabled; and, when the transmission pauses of several of the tire pressure control devices exceed the pregiven first limit value, determining, with the aid of the characteristic field, whether the air pressure in the tires of the motor vehicle is adequate or whether the air pressure in at least one tire is not adequate.

The formulation that the air pressure in the tires of the motor vehicle is sufficient is understood to mean that the air pressure of each tire of the motor vehicle does not deviate from a pregiven desired air pressure by more than a pregiven value. This embodiment too makes use of the condition that mostly both tire pressure control systems operate simultaneously and the above-mentioned characteristic field can therefore be prepared with high accuracy. The advantage of this further embodiment is seen in that for the case wherein the transmission pause of several tire pressure control devices exceeds the pregiven first value, the reliability of the statement as to whether the air pressure in the tires of the motor vehicle is sufficient or whether the air pressure in at least one of the tires is insufficient can be considerably increased.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
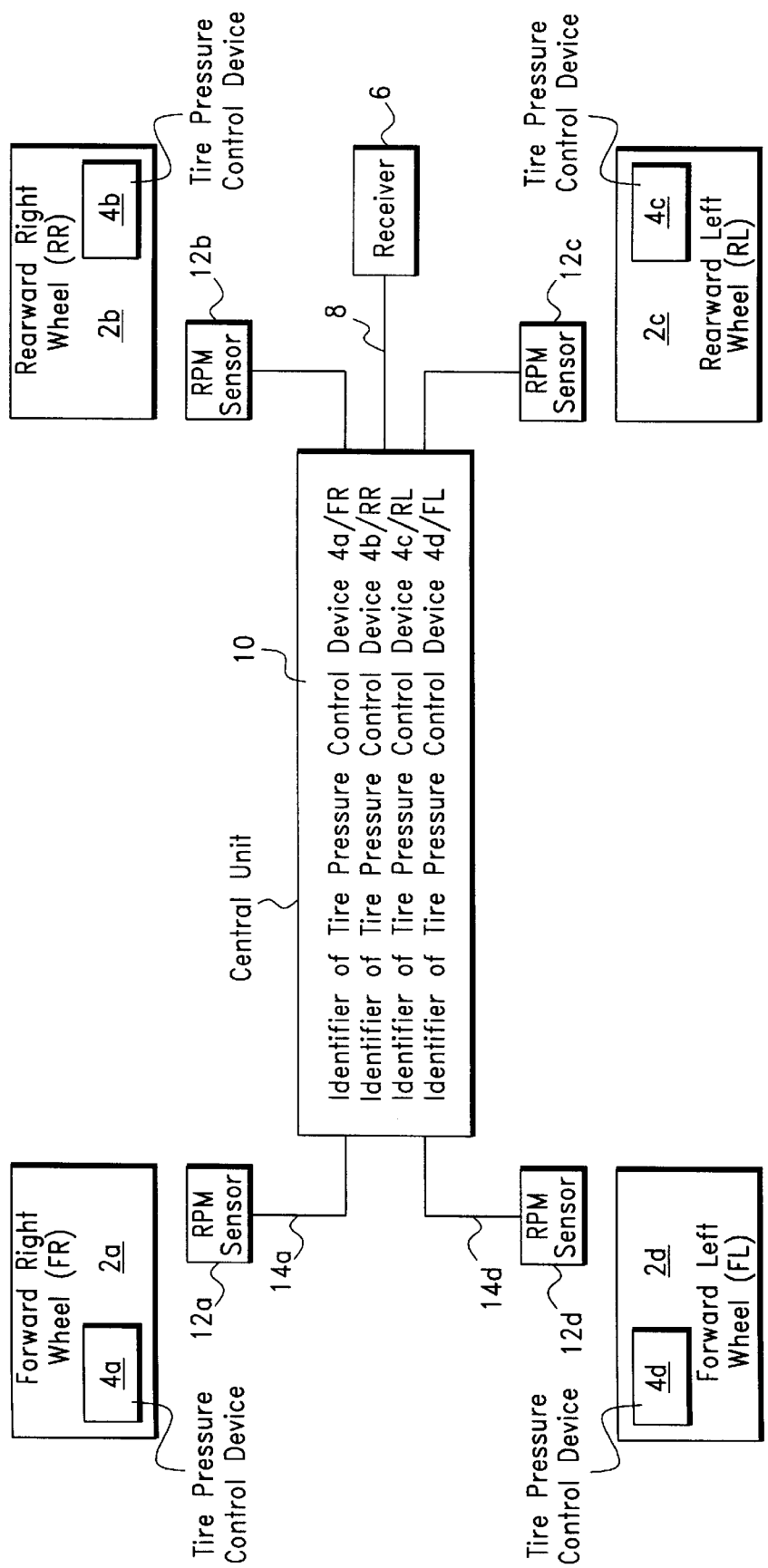
FIG. 1 is a schematic representation of a motor vehicle equipped with a tire pressure control system in accordance with the invention; and, FIG. 2 is a flowchart which exemplifies a method according to an embodiment of the invention.

FIG. 1 shows a schematic of a motor vehicle having wheels 2a to 2d with the vehicle being equipped with a first tire pressure control system. The first tire pressure control system includes, inter alia, tire pressure control devices 4a to 4d of which one each is contained in corresponding ones of the tires of the wheels 2a to 2d (for example, in the rubber of the tire or in or on the valve) or the control devices are assigned to corresponding ones of the tires (for example, by corresponding positioning and attachment to the wheel rim). The tire pressure control devices 4a to 4d each have a transmitter with the aid of which they can transmit data in the form of high-frequency signals to a receiver 6 without contact. The receiver 6 transmits the received data via the transmission path 8 to a central unit 10. In the simplest case, the receiver 6 is configured as a receiver antenna with the aid of which the central unit 10 receives the transmitted data.

In the following it is explained by way of example as to how the air pressure of the wheel 2a (wheel position "front right") is monitored with the aid of the tire pressure control device 4a. In FIG. 1, the wheel positions "forward right", "rearward right", "rearward left" and "forward left" are identified by FR, RR, RL and FL.

The tire pressure control device 4a measures the air pressure of the tire of the motor vehicle 2a at regular time intervals (approximately once every minute) and transmits a data transmission to the central unit 10. This data transmission contains an individual identifier of the tire pressure control device 4a and the measured air pressure. In the central unit 10, value pairs of the form (identifier of a tire pressure control device/wheel position) are stored for each wheel position of the motor vehicle. The central unit 10 compares the transmitted individual identifier to the stored individual identifiers and determines that the tire pressure control device 4a is assigned to the wheel position "forward right". Thereupon, the central unit 10 compares the air pressure, which is transmitted with the data transmission, with an air pressure, which is stored for the corresponding wheel position, and outputs a warning signal when the transmitted air pressure deviates from the stored air pressure by more than a pregiven amount. The air pressures of the wheels 2b to 2d is monitored with the aid of the tire pressure control devices 4b to 4d.

In addition to the first tire pressure control system, the motor vehicle is provided with a second tire pressure control system with the aid of which the air pressure of the wheels 2a to 2d can be determined independently from the first tire pressure control system. The second tire pressure control system is a system which determines the air pressure of the wheels 2a to 2d with the aid of rpm sensors 12a to 12d fixedly allocated to respective ones of the wheels 2a to 2d. Each rpm sensor 12a to 12d transmits the signal generated by the sensor via respective transmission paths 14a to 14d to the central unit 10. The central unit 10 knows from which wheel position the rpm sensor signal is transmitted. For example, if a signal is applied to the transmission path 14a, then the central unit knows that this signal is transmitted by the rpm sensor 12a which is assigned to the wheel position "forward right". The same applies to the remaining rpm sensors 12b to 12d.

In the central unit 10, the air pressure of the wheels 2a to 2d can be determined from the rpm sensor signals in a manner known per se. Corresponding methods are disclosed, for example, in European patent publications 0,647,536 and 0,675,812 as well as in German patent publication 4,400,913. Alternatively, it is possible that one or more characteristic fields are generated from the signals of the tire pressure control devices 4a to 4d and the signals of the rpm sensors 12a to 12d. The air pressure of the wheels 2a to 2d can be determined from these characteristic fields(s). This is explained in greater detail with respect to FIG. 2.

Figure 2:
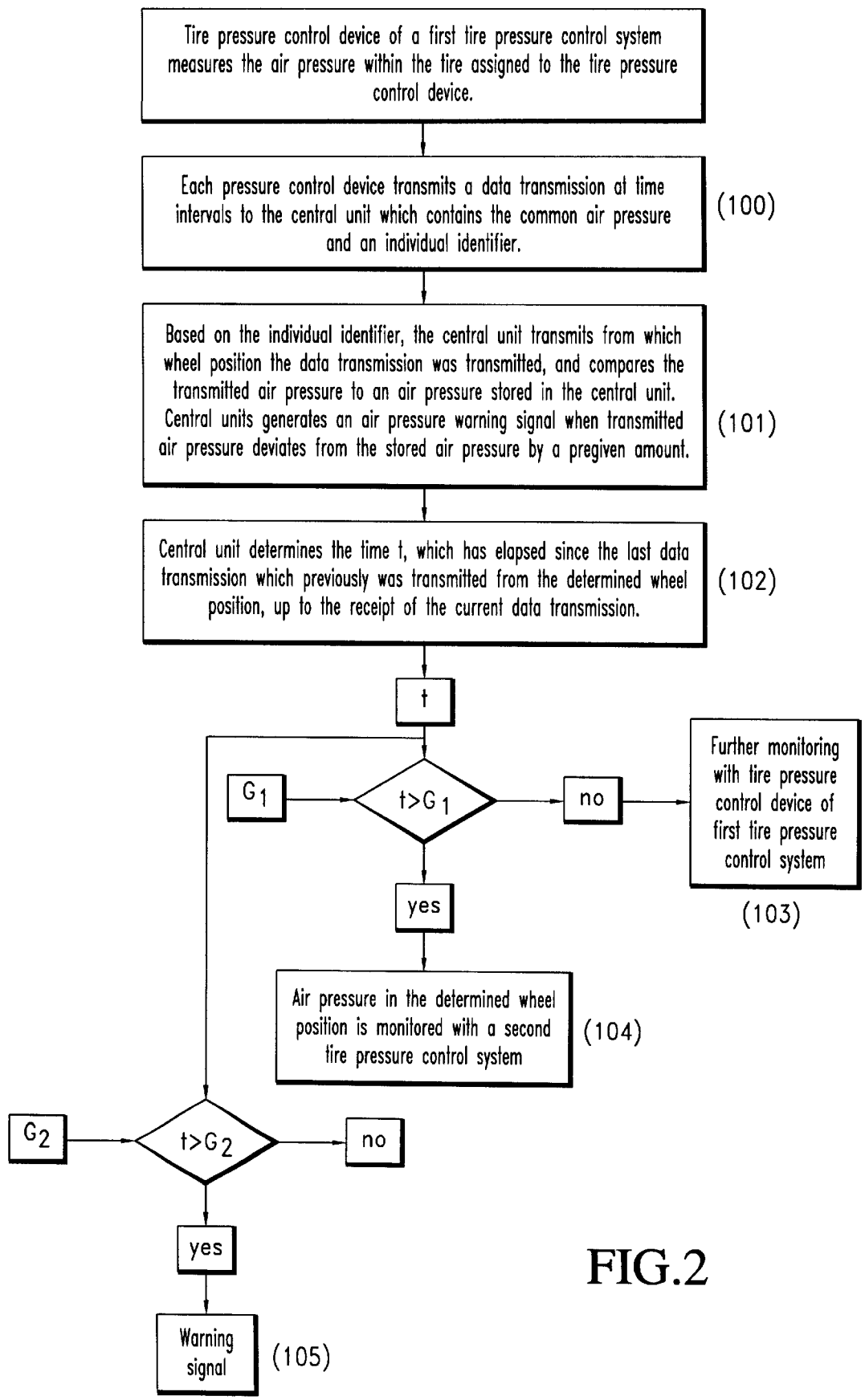

In connection with FIG. 2, it will now be explained how the operability of the first tire pressure control system is monitored in the central unit 10 and which measures are initiated when a disturbance occurs in this system.

The central unit 10 receives the data transmission of a tire pressure control device (step 100) at any desired time point. Directly after receipt of the data transmission, a check is made in the central unit as to from which wheel position the data transmission had been transmitted based on the transmitted individual identifier and, thereafter, the transmitted air pressure is compared to the stored air pressure (step 101, please also refer to the description of FIG. 1). Further, directly after the receipt of the data transmission, a reset signal R is outputted to a counter which is thereby reset to 0. The counter then begins to count the time (t) (step 102) which has elapsed since the receipt of the data transmission and the count of the counter is outputted to a first input of the comparator 16. A first limit value $G_1$ is applied to a second input of the comparator and this limit value is at least slightly greater than the transmission pause which typically lies between the transmission of two data transmissions of a tire pressure control device (for example, if each tire pressure control device 4a to 4d transmits a data transmission every 60 seconds to the central unit 10, then the limit value $G_1$ is at least one minute or is at least slightly greater). A continuous check is made in comparator 16 as to whether the time (t), which has elapsed since the last transmission, is greater than the first limit value $G_1$.

If the transmission pauses, which lie between two sequential data transmissions of a tire pressure control device, are always less than the pregiven first limit value $G_1$, then the counter is always reset by the reset signal R before the time (t), which has elapsed since the last data transmission, reaches the limit value $G_1$. In this way, the comparator 16 always supplies the output signal "no" when the tire pressure control device is operational and the air pressure monitoring of the tire is always carried out with the tire pressure control device assigned to it.

However, if there is a disturbance in the first tire pressure control system and the transmission pause between two sequential data transmissions of a tire pressure control device is increased because of this disturbance, then the time (t), which has elapsed since the last data transmission of the tire pressure control device, exceeds the pregiven first limit value $G_1$ and the comparator 16 supplies the result "yes". In this case, at least the air pressure of the wheel, which is assigned to the tire pressure control device, is monitored with the aid of the second tire pressure control system. An announcement is outputted to the driver of the motor vehicle (step 105) when the second tire pressure control system determines an impermissible drop in air pressure of the tire in the corresponding wheel position.

The time (t), which has elapsed since the last data transmission of a tire pressure control device, is additionally applied to a first input of a second comparator 18 wherein the last data transmission is compared to a second pregiven limit value $G_2$ which is significantly greater than the first pregiven characteristic value (that is, at least one order of magnitude greater; if the first limit value $G_1$ is one 1 to 4 minutes, then the second limit value $G_2$ is at least 10 to 40 minutes).

If the transmission pause between two data transmissions of a specific tire pressure control device is always less than the second pregiven limit value $G_2$, then this is an indication that a disturbance, which possibly occurred in the first tire pressure control system, is shorter than the time pregiven by the second limit value $G_2$ After correcting the temporary disturbance (that is, when all tire pressure control devices 4a to 4d again transmit their data transmissions to the central unit 10 at the provided time intervals), the air pressure in the tire of the motor vehicle is again controlled by means of the first tire pressure control system (that is, by means of the transmitted data transmissions) as already explained in connection with FIG. 1. The correction of the temporary disturbance is recognized by the central unit 10 in that data transmissions of all tire pressure control devices 4a to 4d are received again in the provided time intervals and the transmission pauses between the individual data transmissions thereby no longer exceed the first limit value $G_1$.

Only when a transmission pause between two data transmissions of a tire pressure control device takes longer than the time which is pregiven by the second limit value $G_2$, does the central unit 10 draw the conclusion of a disturbance of the first tire control system which is not temporary and the comparator 18 supplies the result "yes". In this case, a warning signal is outputted to the driver of the motor vehicle (step 105).

EXAMPLE

Each tire pressure control device 4a to 4d transmits a data transmission to the central unit 10 once every minute in uneven intervals. The spacing between two data transmissions of a specific tire pressure control device (for example, the tire pressure control device 4a) can thereby amount to a maximum of 120 seconds. Correspondingly, a value of 130 seconds is pregiven for the first limit value $G_1$ and a limit value of 30 minutes is pregiven for the second limit value $G_2$ At any desired time point, a tire pressure control device (for example, control device 4a) supplies a data transmission to the central unit 10. The central unit 10 recognizes that the data transmission is transmitted from the tire pressure control device 4a in the wheel position "forward right" based on the transmitted individual identifier. The central unit 10 measures the time (t), which has elapsed since this data transmission, and compares this time continuously to the first pregiven limit value $G_1$. If the tire pressure control device 4a supplies a further data transmission within the next 120 seconds, then the central unit 10 again recognizes that this data transmission originates from the tire pressure control device 4a on the basis of the individual identifier. Correspondingly, the central unit determines that the maximum transmission pause of 120 seconds had been maintained and the comparator 16 supplies the result "no". The air pressure of the wheel 2a can continue to be monitored by the tire pressure control device 4a.

If, in contrast, the tire pressure control device 4a transmits no further data transmission for longer than 130 seconds to the central unit 10, then the comparator 16 supplies the result "yes". At least the air pressure of the wheel 2a is monitored in the central unit 10 with the aid of the second tire pressure control system. If a deviation of the air pressure greater than a pregiven amount is determined in the central unit 10, then a warning is outputted to the driver of the motor vehicle.

If the next data transmission of the tire pressure control device 4a is received by the central unit 10 within the next 30 minutes, then only a short-term operational disturbance was present in the first tire pressure control system so that the second comparator 18 always supplies the result "no". However, if more than 30 minutes pass since the last data transmission of the tire pressure control device 4a, then the comparator 18 supplies the result "yes" after 30 minutes and a warning signal is outputted to the driver of the motor vehicle. In the same way, the transmission pauses between two data transmissions of the tire pressure control devices 4b to 4d are monitored and the corresponding procedure is followed when one of the two limit values $G_1$ or $G_2$ is exceeded.

In a second tire pressure control system, rpm sensors 12a to 12d are assigned to respective wheels of the motor vehicle as shown in FIG. 1. In the following, it will be explained how, with the aid of this second tire pressure control system, the air pressure in the tires of the wheels 2a to 2d can be determined. The rpm sensors 12a to 12d are preferably components of a slip control system and detect (for example, by means of a gear wheel disc) the rotational wheel speeds U1 to U4, that is, the number of revolutions per unit of time of the wheels 2a to 2d of the motor vehicle. The mean wheel rotational speed $U_m=(U1+U2+U3+U4)/4$ is computed from the individual wheel rotational speeds. Accordingly, for each wheel 2a to 2d, a wheel rpm ratio $Ri=U_i/U_m$ (i=1 to 4) is computed which lies, in each case, in the vicinity of 1.

A dimensionless quantity DEL is computed from the wheel rpm ratios R1 to R4 as follows:

$$DEL=\{((a_1 \times P_{des1}/P_1))+b_1) \times R1+((a_3 \times P_{des3}/P3)+b_3) \times R3\}$$
$$=\{((a_2 \times P_{des2}/P2)+b_2) \times R2+((a_4 \times P_{des4}/P4)+b_4) \times R4\}$$

wherein the constants $a_1$ to $a_4$ define the pressure dependency of the dynamic wheel perimeter and the constants $b_1$ to $b_4$ correct wheel perimeters, which deviate from the mean value and are based on the effect of construction of the tire. DEL compensates curves having low transverse acceleration when the wheel rpm ratios R1 and R3 or R2 and R4 belong, respectively, to diagonally opposite-lying wheels 2a to 2d of the motor vehicle. Usually, DEL becomes zero, that is, when the pressure values $P_1$ to $P_4$, which are transmitted from the tire pressure control devices 4a to 4d, do not deviate by more than a pregiven amount from the desired pressure values $P_{des1}$ to $P_{des4}$ of the corresponding tires.

DEL defines a characteristic field from which one of the pressure values $P_1$ to $P_4$ can be computed when all other quantities in the above equation are known. Furthermore, it can be derived from the characteristic field whether all pressure values $P_1$ to $P_4$ are sufficient in the tires of the motor vehicle when all other quantities in the above equation are known. A detailed explanation will now be provided as to how this takes place.

In the following, it will first be explained as to how the eight constants $a_1$ to $a_4$ and $b_1$ to $b_4$ can be computed in the central unit. Most of the time, the first tire pressure control system as well as the second tire pressure control system will operate. The first tire pressure control system determines the air pressure in the tires with the aid of the tire pressure control devices 4a to 4d and the second tire pressure control system has the rpm sensors 12a to 12d. Accordingly, in the central unit, the measured pressure values $P_1$ to $P_4$ can always be inserted into the determination equation for DEL when these pressure values are transmitted by the pressure control devices 4a to 4d. Furthermore, the wheel rpm ratios R1 to R4 are inserted into the determination equation for DEL. The wheel rpm ratios R1 to R2 are computed in the central unit 10 at a specific time point. As a time point for the computation, that time point, for example, can be applied wherein the last pressure value $P_4$ was transmitted of the four pressure values $P_1$ to $P_4$ to be transmitted (the central unit 10 recognizes four pressure values $P_1$ to $P_4$ which belong together, from the four different individual identifiers which are transmitted by the tire pressure control devices 4a to 4d). The desired pressure values $P_{des1}$ to $P_{des4}$ are stored in the central unit 10 for each wheel position. These desired pressure values, the transmitted pressure values $P_1$ to $P_4$ and the wheel rpm ratios R1 to R4, which are computed in the central unit 10, are inserted into the equation for DEL. Since DEL should become 0, the equation obtained in this manner is a determination equation for the eight unknowns $a_1$ to $a_4$ and $b_1$ to $b_4$.

New measured pressure values $P_1$ to $P_4$ are continuously transmitted by the tire pressure control devices 4a to 4d. By repeating the above-mentioned method, one therefore obtains eight determination equations in the course of time for the eight unknowns $a_1$ to $a_4$ and $b_1$ to $b_4$ whose one side is always zero because the value of DEL is always zero. If one, for example, proceeds from the situation that each tire pressure control device 4a to 4d transmits, once per minute, the pressure values $P_1$ to $P_4$ measured thereby to the central unit 10, then one obtains such an equation system in the central unit 10 having eight equations within eight minutes. The unknowns $a_1$ to $a_4$ and $b_1$ to $b_4$ can be clearly determined from this equation system.

In the course of time, one can always again newly determine the eight unknowns $a_1$ to $a_4$ and $b_1$ to $b_4$ in the manner described above from eight equations which are put together into an equation system and, from values determined in the past, mean values $a_{1m}$ to $a_{4m}$ and $b_{1m}$ to $b_{4m}$ can be computed for the constants $a_1$ to $a_4$ and $b_1$ to $b_4$. The longer the time span over which the first tire pressure control system having the tire pressure control devices 4a to 4d and the second tire pressure control system having the rpm sensors 12a to 12d operate together, the more precisely do the computed mean values $a_{1m}$ to $a_{4m}$ and $b_{1m}$ to $b_{4m}$ approach the actual values of the constants $a_1$ to $a_4$ and $b_1$ to $b_4$.

In order to determine how well the mean values $a_{1m}$ to $a_{4m}$ and $b_{1m}$ to $b_{4m}$ reflect the actual values for the constants $a_1$ to $a_4$ and $b_1$ to $b_4$, one can proceed as follows. One inserts the following into the determination equation for DEL: the mean values $a_{1m}$ to $a_{4m}$ and $b_{1m}$ to $b_{4m}$ the actual measured pressure values $P_1$ to $P_4$, the determined wheel rpm ratios R1 to R4 and the desired pressure values $P_{des1}$ to $P_{des4}$. Then, DEL is computed with these quantities. In the ideal case (that is, when all mean values $a_{1m}$ to $a_{4m}$ and $b_{1m}$ to $b_{4m}$ correspond to the actual constants $a_1$ to $a_4$ and $b_1$ to $b_4$, respectively), DEL goes to zero. However, the computed mean values for the constants will, with great probability, deviate from the actual values. For this reason, the value of DEL computed as above will also deviate from zero. One characterizes the amount of the deviation from zero by "e" so that this quantity e is a measure as to how precise the mean values $a_{1m}$ to $a_{4m}$ and $b_{1m}$ to $b_{4m}$ of the constants have been determined.

If one repeats the described method several times, then one obtains several values of e from which a mean value $e_m$ can be computed and this is a reliable index for the quality of the computation of the mean values $a_{1m}$ to $a_{4m}$ and $b_{1m}$ to $b_{4m}$ of the constants $a_1$ to $a_4$ and $b_1$ to $b_4$.

In the following, a description will be provided as to how the air pressure in a tire can be determined when the corresponding tire pressure control devices 4a to 4d in this tire become inoperable and the transmission pause of these tire pressure control devices 4a to 4d exceed the first limit value $G_1$ (see FIG. 2). Here, one starts with the exemplary premise that the tire pressure control device 4a becomes inoperable and therefore the pressure value $P_1$ is no longer transmitted to the central unit 10 (that is, there is no longer reception from this control device because of a disturbance). All known quantities are inserted into the determination equation for DEL in the central unit 10, that is, the previously computed $a_{1m}$ to $a_{4m}$ and $b_{1m}$ to $b_{4m}$ and the desired pressure values $P_{des1}$ to $P_{des4}$, the wheel rpm ratios R1 to R4 computed in the central unit and the pressure values P2 to P4 transmitted by the tire pressure control devices 4b to 4d. Furthermore, it is assumed in the central unit 10, that the air pressure in the tire of the wheel 2a has remained substantially constant since the last transmission and therefore substantially corresponds to air pressure P1 transmitted last from the tire pressure control device 4a. Correspondingly, the last transmitted pressure value $P_1$ is inserted into the determination equation for DEL in the central unit 10. Accordingly, all quantities are inserted into the determination equation for DEL so that DEL can be computed in the central unit 10. Thereafter the following condition is checked in the central unit 10: $|DEL|>n\times\epsilon_{m1}, n\geq 1$, (the significance of the factor n is described in the next paragraph).

If this is the case, then the central unit 10 concludes that the air pressure of the tire of the wheel 2a deviates by more than a pregiven amount from the desired air pressure $P_{des1}$ (if it would not do this, $|DEL|\leq n\times\epsilon_m$). A warning is outputted to the driver of the vehicle when such impermissible deviation of the air pressure $P_1$ of the tire of the wheel 2a is determined in the central unit 10. The magnitude of the pressure deviation of the air pressure $P_1$ from desired air pressure $P_{des1}$ can be estimated in that the pressure value $P_1$ is varied in the determination equation for DEL until the condition $|DEL|\leq n\times\epsilon_m$ is satisfied. One can proceed in a corresponding manner when one of the other tire pressure control devices 4b to 4d becomes inoperable in lieu of the tire pressure control device 4a.

In the following, the significance of the above-mentioned factor n is explained. For the case that n=1, the inequality, which is mentioned in the last paragraph, becomes $|DEL|>\epsilon_m$. If $|DEL|$ becomes greater than $\epsilon$ ($|DEL|>\epsilon$), when one of the tire pressure control devices 4a to 4d becomes inoperable, then one can state that the air pressure in the corresponding wheel deviates from the pregiven air pressure by more than a pregiven amount. However, in the boundary case (that is, when $|DEL|\approx\epsilon_m$, a decision can be made only with difficulty because this means either that the air pressure in the corresponding tire is correct and the deviation of the value $|DEL|$ from 0 comes about by the inaccurate determination of the constants $a_1$ to $a_4$ and $b_1$ to $b_4$ or it means that the constants $a_1$ to $a_4$ and $b_1$ to $b_4$ have been precisely determined and the air pressure in the tire already deviates from the pregiven desired air pressure by more than a pregiven amount.

The greater one selects the value of n, the more reliable is the statement that the air pressure in a tire of the motor vehicle deviates by more than a pregiven amount from the desired air pressure when $|DEL|>n\times\epsilon_m$. Preferably the value of n lies between 1 and 3.

In the following, it is explained how the central unit can draw a conclusion as to the pressure values in the tires of the motor vehicle with the aid of the determination equation for DEL when more than one or all tire pressure control devices 4a to 4d are inoperable and therefore the transmission pause of each tire pressure control device 4a to 4d exceeds the first limit value $G_1$ (see FIG. 2), for example, because the motor vehicle is in the region of a disturbance transmitter. In this case, the mean values $a_{1m}$ to $a_{4m}$ and $b_{1m}$ to $b_{4m}$ and the desired pressure values $P_{des1}$ to $P_{des4}$ and the computed wheel rpm ratios R1 to R4 are inserted into the determination equation for DEL in the central unit 10. Furthermore, the premise is taken in the central unit 10 that the air pressures in the tires $P_1$ to $P_4$ correspond approximately to the last transmitted pressure values $P_1$ to $P_4$ and corresponding values are inserted into the determination equation for DEL. Thereupon, the following is checked: $|DEL|>n\times\epsilon$, $n\geq 1$.

If this is the case, then the central unit 10 draws the conclusion that, in at least one of the tires of the motor vehicle, the actual air pressure deviates from the desired air pressure by more than a pregiven amount (otherwise, $|DEL|\leq n\times\epsilon_m$). In this case, a warning is transmitted to the driver of the motor vehicle.

It is noted that the above determination equation for DEL is only exemplary. Any desired other characteristic fields can be used from which a dependency of the measured pressure values results from the wheel velocities which are determined by the wheel rpm sensors 12a to 12d.

It is understood that the foregoing description is that of the preferred embodiments of the invention and that various changes and modifications may be made thereto without departing from the spirit and scope of the invention as defined in the appended claims.

What is claimed is:

1. A method for monitoring the pressure of the tires of a motor vehicle utilizing a first tire pressure control system which includes a central unit and a plurality of tire pressure control devices on corresponding ones of the wheels of the motor vehicle for respective ones of the tires, the method comprising the steps of:

utilizing each one of said tire pressure control devices to measure the air pressure in the tire corresponding thereto at time intervals;

causing each one of said tire pressure control devices to transmit a data transmission to said central unit at time intervals with the data transmission containing at least the measured air pressure and an individual identifier characterizing said one tire pressure control device and with a transmission pause being present between two sequential data transmissions of a specific one of said tire pressure control devices;

monitoring each of the transmission pauses in said central unit which elapses after the receipt of a data transmission which is transmitted by a specific one of said tire pressure control devices;

monitoring the air pressure of the tires of said motor vehicle utilizing a second tire pressure control system at least when at least one of the transmission pauses exceeds a pregiven first limit value;

comparing the transmitted air pressure to an air pressure stored in said central unit; and, causing said central unit to generate an air pressure warning signal when the transmitted air pressure deviates from the stored air pressure beyond a pregiven amount.

2. The method of claim 1, wherein said warning signal is generated when at least one transmission pause exceeds a second limit value which is significantly greater than said first limit value.

3. The method of claim 1, wherein said second tire pressure control system includes a plurality of rpm sensors permanently assigned to corresponding ones of said wheels; and, wherein said second tire pressure control system monitors the air pressure of the tires utilizing said rpm sensors.

4. The method of claim 1, comprising the further steps of:

permanently allocating an rpm sensor to each one of said wheels;

forming at least one characteristic field from the signals transmitted by the rpm sensors and the air pressures transmitted by said tire pressure control devices;

at least approximately determining the air pressure of a tire for which the specific tire pressure control device is disabled from said characteristic field when knowing the signals of the rpm sensors and the air pressures transmitted by the remaining ones of said tire pressure control devices; and, when the transmission pause of a specific one of said tire pressure control devices exceeds the pregiven first limit value, at least approximately determining the air pressure of the corresponding tire with the aid of said characteristic field, the rpm sensor signals and the air pressures transmitted from the remaining ones of said tire pressure control devices.

5. The method of claim 1, comprising the further steps of:

permanently allocating an rpm sensor to each one of said wheels;

forming at least one characteristic field from the signals transmitted by said rpm sensors and the air pressure transmitted by said tire pressure control devices;

determining whether the air pressure in the tires is adequate or whether the air pressure in at least one of the tires is not adequate by utilizing said characteristic field when knowing said rpm signals when several of said tire pressure control devices are disabled; and, when the transmission pauses of several of said tire pressure control devices exceed the pregiven first limit value, determining, with the aid of said characteristic field, whether the air pressure in the tires of the motor vehicle is adequate or whether the air pressure in at least one tire is not adequate.

6. A motor vehicle comprising:

a first tire pressure control system including a central unit and a plurality of tire pressure control devices on corresponding ones of the wheels of said motor vehicle for respective ones of the tires; and, said first tire pressure control system functioning to monitor the air pressures of said tires as follows:

each of said tire pressure control devices measures the air pressure of the tire assigned thereto at time intervals;

each one of said tire pressure control devices transmits a data transmission to said central unit at time intervals with the data transmission containing at least the measured air pressure and an individual identifier characterizing said one tire pressure control device and with a transmission pause being present between two sequential data transmissions of a specific one of said tire pressure control devices; and, each transmission pause is monitored in said central unit which elapses after receipt of a data transmission which is transmitted by a specific one of said tire pressure control devices;

a second tire pressure control system for monitoring the air pressure of said tires at least when at least one transmission pause exceeds a pregiven first limit value; and, said control unit functioning to compare the transmitted air pressure to an air pressure stored in said central unit and functioning to generate an air pressure warning signal when the transmitted air pressure deviates from the stored air pressure beyond a pregiven amount.

\* \* \* \* \*

UNITED STATES PATENT AND TRADEMARK OFFICE
CERTIFICATE OF CORRECTION

PATENT NO. : 6,446,023 B1
DATED : September 3, 2002
INVENTOR(S) : Gerhard Ernst

It is certified that error appears in the above-identified patent and that said Letters Patent is hereby corrected as shown below:

Column 7,
Line 53, delete "$G_2$" and substitute -- $G_2$. -- therefor.

Column 8,
Line 17, delete "$G_2$" and substitute -- $G_2$. -- therefor.

Column 9,
Lines 9 and 10, delete
"DEL = $\{((a_1 \times P_{des1}/P_1) + b_1)) \times R1 + ((a_3 \times P_{des3}/P3) + b_3) \times R3\}$
= $\{((a_2 \times P_{des2}/P2) + b_2) \times R2 + ((a_4 \times P_{des4}/P4) + b_4) \times R4\}$"
and substitute
-- DEL = $\{((a_1 \times P_{des1}/P_1) + b_1) \times R1 + ((a_3 \times P_{des3}/P3) + b_3) \times R3\}$
- $\{((a_2 \times P_{des2}/P2) + b_2) \times R2 + ((a_4 \times P_{des4}/P4) + b_4) \times R4\}$ --
therefor.

Line 50, delete "$P_4$" and substitute -- $P_4$, -- therefor.

Column 10,
Line 24, delete "$b_{4m}$" and substitute -- $b_{4m}$, -- therefor.
Line 34, delete ""e"" and substitute -- "$\epsilon$" -- therefor.
Lines 35 and 39, delete "e" and substitute -- $\epsilon$ -- therefor.
Line 39, delete "$e_m$" and substitute -- $\epsilon_m$ -- therefor.

Signed and Sealed this

Nineteenth Day of August, 2003

JAMES E. ROGAN
*Director of the United States Patent and Trademark Office*